United States Patent
Yamada

(10) Patent No.: US 11,101,730 B2
(45) Date of Patent: *Aug. 24, 2021

(54) DRIVE SIGNAL GENERATING CIRCUIT AND POWER SUPPLY CIRCUIT

(71) Applicant: FUJI ELECTRIC CO., LTD., Kawasaki (JP)

(72) Inventor: Ryuji Yamada, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 44 days.

This patent is subject to a terminal disclaimer.

(21) Appl. No.: 16/727,085

(22) Filed: Dec. 26, 2019

(65) Prior Publication Data

US 2020/0251988 A1  Aug. 6, 2020

(30) Foreign Application Priority Data

Feb. 4, 2019  (JP) .............................. JP2019-018080

(51) Int. Cl.
*H02M 1/42* (2007.01)
*H02M 3/158* (2006.01)

(52) U.S. Cl.
CPC ......... *H02M 1/4225* (2013.01); *H02M 3/158* (2013.01); *H02M 3/1588* (2013.01)

(58) Field of Classification Search
CPC .................. H02M 1/4225; H02M 3/155–1588
See application file for complete search history.

(56) References Cited

U.S. PATENT DOCUMENTS

| | | | | | |
|---|---|---|---|---|---|
| 5,475,296 | A | * | 12/1995 | Vinsant | H02M 3/157 323/223 |
| 2009/0267582 | A1 | * | 10/2009 | Prodic | H02M 3/157 323/283 |
| 2012/0223692 | A1 | * | 9/2012 | Prodic | H02M 3/1584 323/283 |
| 2015/0032396 | A1 | * | 1/2015 | Pazhayaveetil | H03F 3/187 702/65 |

(Continued)

FOREIGN PATENT DOCUMENTS

| JP | 2014-235993 A | 12/2014 |
|---|---|---|
| JP | 2016-073030 A | 5/2016 |

(Continued)

*Primary Examiner* — Peter M Novak
(74) *Attorney, Agent, or Firm* — Rabin & Berdo, P.C.

(57) ABSTRACT

A power supply circuit having a rectifier circuit that rectifies an AC voltage, an inductor, a transistor that controls an inductor current flowing through the inductor, a drive signal generating circuit that generates a drive signal based on the inductor current and an output voltage generated from the AC voltage, and a drive signal output circuit outputting the drive signal. The drive signal generating circuit includes a command-value output unit that outputs a command value for increasing and decreasing the inductor current when the output voltage is lower or higher than a target level, respectively, an inductance calculation unit that calculates an inductance of the inductor based on first and second current values of the inductor at first and second timings after the inductor current increases from zero and decreases, respectively, and an ON-period calculation unit that calculates an ON period in a switching period of the transistor.

9 Claims, 9 Drawing Sheets

(56) References Cited

U.S. PATENT DOCUMENTS

2020/0036287 A1\* 1/2020 Peretz .................... G05F 1/575

FOREIGN PATENT DOCUMENTS

| JP | 2018-182774 A | 11/2018 |
| WO | 2010/023978 A1 | 3/2010 |
| WO | 2010/061652 A1 | 6/2010 |
| WO | 2010/061654 A1 | 6/2010 |
| WO | 2010/106701 A1 | 9/2010 |

\* cited by examiner

DRIVE SIGNAL GENERATING CIRCUIT AND POWER SUPPLY CIRCUIT

CROSS-REFERENCE TO RELATED APPLICATION

The present application claims priority pursuant to 35 U.S.C. § 119 from Japanese patent application number 2019-018080, filed on Feb. 4, 2019, the entire disclosure of which is hereby incorporated by reference herein.

BACKGROUND

Technical Field

The present disclosure relates to a drive signal generating circuit and a power supply circuit.

Description of the Related Art

A typical power factor correction circuit (hereinafter referred to as the PFC circuit) improves the power factor of a power supply by causing an inductor current flowing through an inductor of the PFC circuit to be similar in waveform to a rectified voltage that is obtained by rectifying an AC voltage (for example, Japanese Patent Application Publication No. 2014-235993).

When the PFC circuit is operated in a discontinuous mode in which the inductor current intermittently flows, the current value of the inductor current greatly changes in general. An inductance of the inductor also changes with the current value of the inductor current. Thus, if the PFC circuit is operated without considering such a change in inductance, the power factor may deteriorate.

The present invention has been achieved in view of such an issue as above, and an object thereof is to provide a drive signal generating circuit capable of improving the power factor of a PFC circuit.

SUMMARY

A main aspect of the present disclosure for solving an issue described above is a drive signal generating circuit that generates a drive signal based on an output voltage generated from an AC voltage and an inductor current flowing through an inductor, the inductor being configured to be applied with a rectified voltage from a rectifier circuit that rectifies the AC voltage, the drive signal being used for turning on and off a transistor that controls the inductor current, the drive signal generating circuit comprising: a command-value output unit that outputs a command value for increasing the inductor current when the output voltage is lower than a target level and reducing the inductor current when the output voltage is higher than the target level; an inductance calculation unit that calculates an inductance of the inductor based on a first current value of the inductor current at a first timing after the inductor current increases from zero, a second current value of the inductor current at a second timing after the inductor current decreases, and the output voltage; an ON-period calculation unit that calculates an ON period in a switching period of the transistor based on the calculated inductance, the rectified voltage, the command value, the switching period, and the output voltage, the ON period being a time period for causing the output voltage to reach the target level and for changing the inductor current according to the rectified voltage; and a drive signal output unit that outputs the drive signal based on the calculated ON period and the switching period.

According to the present disclosure, it is possible to provide a drive signal generating circuit capable of improving the power factor of a PFC circuit.

DETAILED DESCRIPTION OF THE INVENTION

At least the following matters are clarified by the description of this specification and the accompanying drawings.

Embodiments

Overview of AC-DC Converter 10

Figure 1:
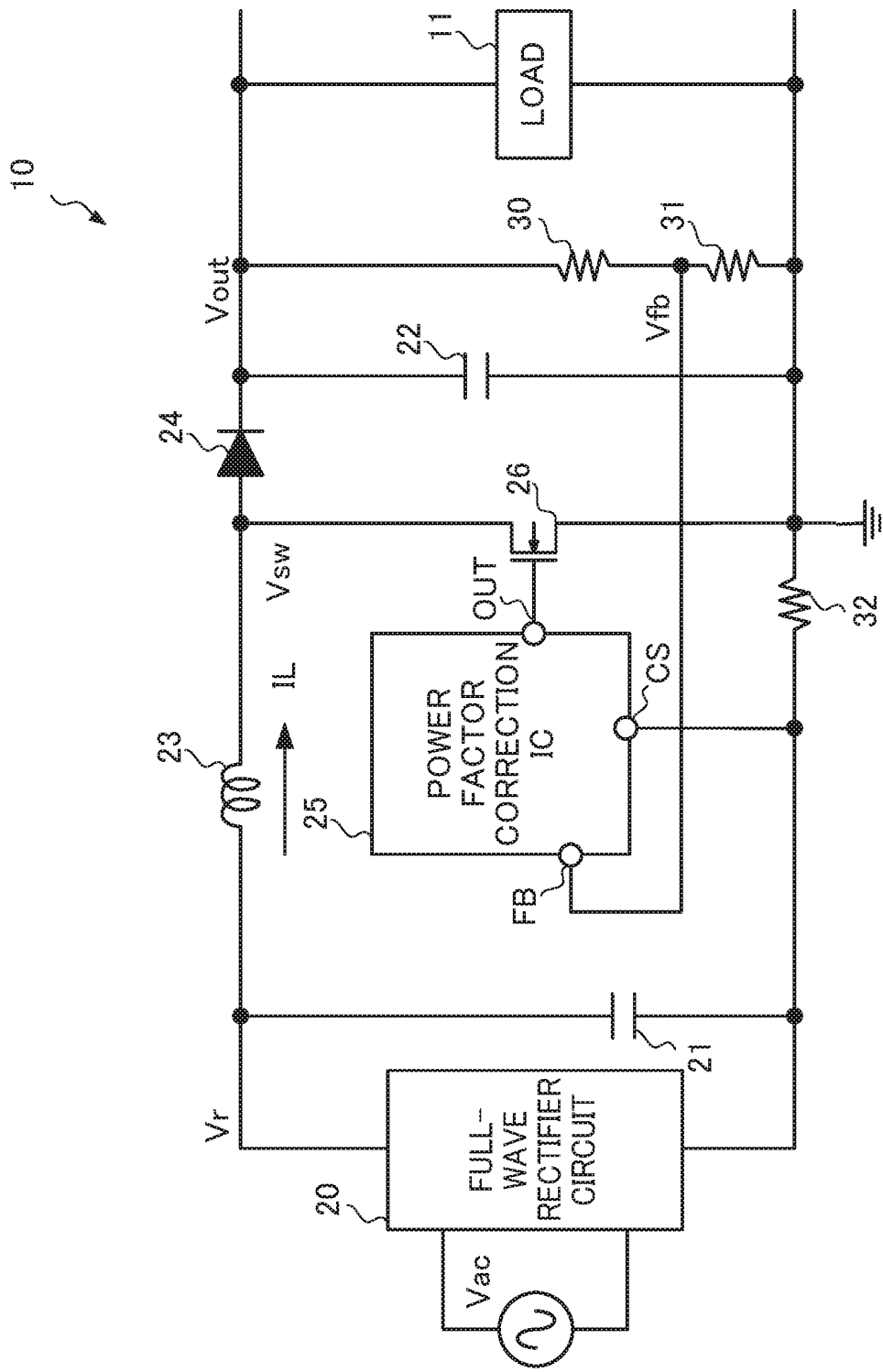
FIG. 1 is a diagram illustrating an example of an AC-DC converter 10.

FIG. 1 is a diagram illustrating the configuration of an AC-DC converter 10 according to an embodiment of the present invention. The AC-DC converter 10 is a power supply circuit of a boost chopper type that generates an output voltage Vout at a target level from an AC voltage Vac of a commercial power supply.

The AC-DC converter 10 (power supply circuit) includes a full-wave rectifier circuit 20, capacitors 21 and 22, an inductor 23, a diode 24, a power factor correction IC 25, an NMOS transistor 26, and resistors 30 to 32.

The full-wave rectifier circuit 20 full-wave rectifies an input predetermined AC voltage Vac and outputs the result to the capacitor 21 and the inductor 23 as a rectified voltage Vr. In an embodiment of the present disclosure, a voltage concerning the AC voltage Vac indicates a voltage between two terminals of the full-wave rectifier circuit 20 and a voltage concerning others indicates a potential difference with respect to reference potential (GND point in FIG. 1). The same applies hereinafter. The AC voltage Vac is, for example, a voltage having an effective value of 140 to 240 V and a frequency of 50 to 60 Hz.

The capacitor 21 smooths the rectified voltage Vr. The capacitor 22, the inductor 23, the diode 24, and the NMOS transistor 26 configure a boost chopper circuit. Thus, a charging voltage of the capacitor 22 results in a DC output voltage Vout. In an embodiment of the present disclosure, a voltage of a node connected with a drain electrode of the NMOS transistor 26, the inductor 23, and the diode 24 is given as a voltage Vsw.

The power factor correction IC 25 (drive signal generating circuit) is an integrated circuit that controls switching of the NMOS transistor 26 such that the output voltage Vout reaches a target level (for example, 400 V) while improving the power factor of the AC-DC converter 10. That is, the power factor correction IC 25 is a control circuit that performs control such that the AC-DC converter 10 operates as a PFC circuit. The power factor correction IC 25 drives the NMOS transistor 26 based on an inductor current IL flowing through the inductor 23 and the output voltage Vout. Details of the power factor correction IC 25 will be described below. The power factor correction IC 25 includes terminals CS, FB, and OUT. In an embodiment of the present disclosure, terminals of the power factor correction IC 25 other than the terminal CS and the like are omitted for convenience.

The NMOS transistor 26 is a switching device for controlling electric power to a load 11 of the AC-DC converter 10. In an embodiment of the present disclosure, the NMOS transistor 26 is an N-type Metal Oxide Semiconductor (MOS) transistor. However, the NMOS transistor 26 may be, for example, a bipolar transistor or an Insulated Gate Bipolar Transistor (IGBT). A gate electrode of the NMOS transistor 26 is connected to a terminal OUT.

The resistors 30 and 31 configure a voltage divider circuit that divides the output voltage Vout and generates a feedback voltage Vfb used in switching the NMOS transistor 26. The feedback voltage Vfb generated at a node, to which the resistors 30 and 31 are connected, is applied to the terminal FB.

The resistor 32 is a resistor for detecting the inductor current IL, and has one end connected to a source electrode of the NMOS transistor 26 and the other end connected to the terminal CS.

Power Factor Correction IC 25

Configuration of Power Factor Correction IC 25

Figure 2:
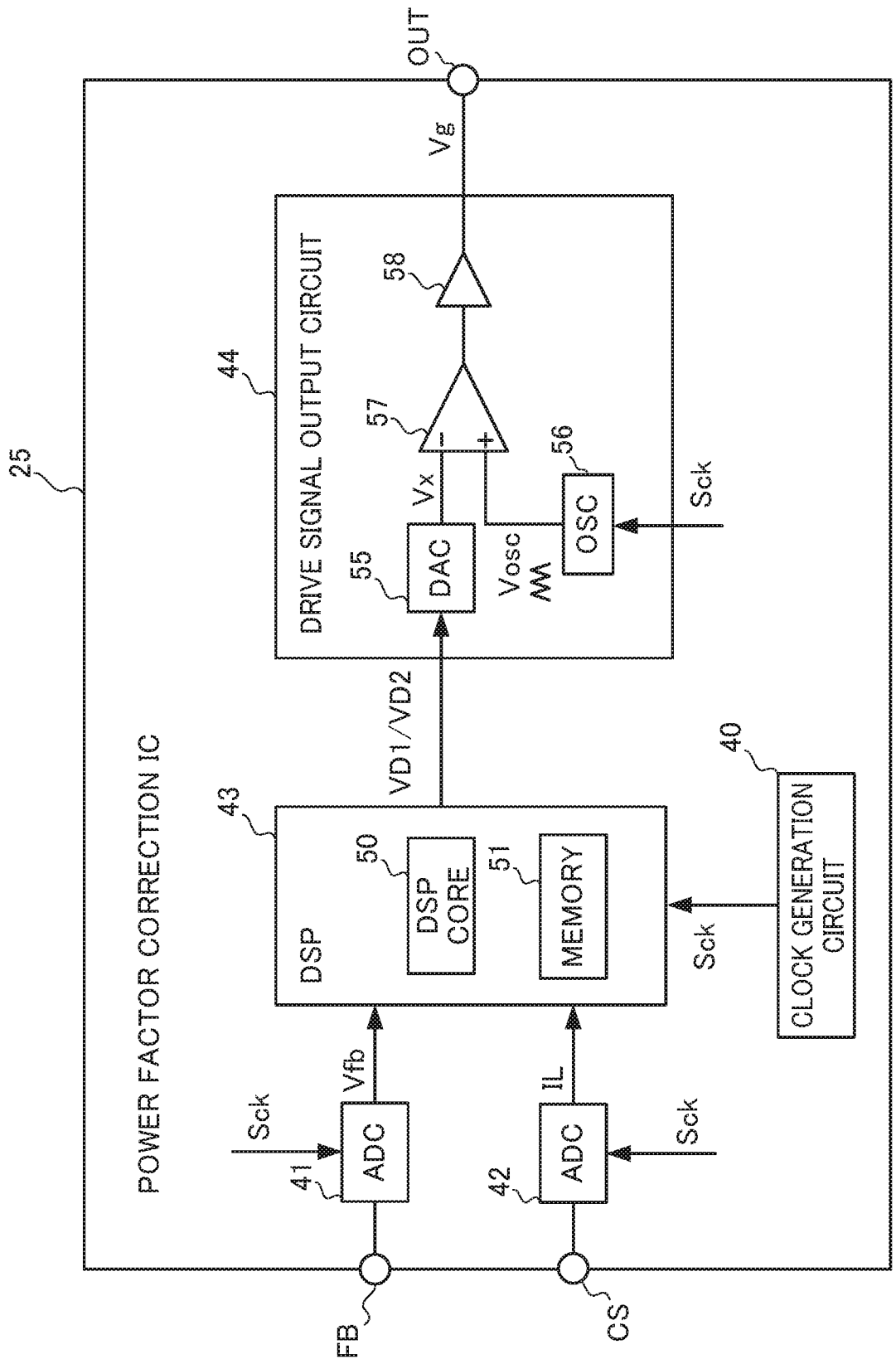
FIG. 2 is a diagram illustrating a configuration of a power factor correction IC 25.

FIG. 2 is a diagram illustrating the configuration of the power factor correction IC 25. The power factor correction IC 25 includes a clock generation circuit 40, AD converters (ADCs: Analog-to-Digital Converters) 41 and 42, a digital signal processing circuit (DSP) 43, and a drive signal output circuit 44.

The clock generation circuit 40 outputs a clock signal Sck having a cycle equal to a cycle in which the NMOS transistor 26 performs switching (hereinafter referred to as the "switching period T"). The clock signal Sck has a frequency of, for example, 50 to 100 kHz.

The AD converter 41 converts the feedback voltage Vfb into a digital value. The AD converter 42 converts a voltage indicating the inductor current IL detected by the resistor 32 into a digital value. In an embodiment of the present disclosure, a voltage indicating the inductor current IL to be processed in the DSP 43 is referred to as the inductor current IL, for convenience. The AD converters 41 and 42 in an embodiment of the present disclosure sample input signals (inductor current IL and the feedback voltage Vfb), for example, at timing when the logic level of the clock signal Sck changes, that is, at a double frequency of the clock signal Sck. It is assumed here that the sampling frequency of the AD converters 41 and 42 is the double frequency (100 to 200 kHz) of the clock signal Sck. However, the sampling frequency may be a higher frequency including the timing when the logic level of the clock signal Sck changes.

The DSP 43 is a circuit that generates a command voltage VD1, VD2 serving as a reference of a drive signal Vg based on the feedback voltage Vfb, the inductor current IL. As explained in detail below, the command voltage VD1 is a voltage for operating the AC-DC converter 10 as a PFC circuit in a continuous mode. The "continuous mode" is a mode in which the inductor current IL continuously flows. On the other hand, the command voltage VD2 is a voltage for operating the AC-DC converter 10 as a PFC circuit in a discontinuous mode. The "discontinuous mode" is a mode in which the inductor current IL intermittently flows, that is, a mode in which there is a time period during which the inductor current IL is zero in each switching period. A "critical mode" for switching ON when an inductor current becomes zero may be dealt with as in the "continuous mode" or may be dealt with as in the "discontinuous mode".

The DSP 43 includes a DSP core 50 and a memory 51 that stores a program to be executed by the DSP core 50 and various types of information. As explained in detail below, the DSP core 50 executes the programs to thereby cause the DSP 43 to implement various circuits and/or functional blocks such as an adder, a subtractor, a multiplier, a divider, a filter, an amplifier circuit, and the like.

The drive signal output circuit 44 (drive signal output unit) outputs the drive signal Vg for turning on and off the NMOS transistor 26 to the terminal OUT, based on the command voltage VD1 or the command voltage VD2.

The drive signal output circuit 44 includes a DA converter (DAC: Digital-to-Analog Converter) 55, an oscillator circuit 56, a comparator 57, and a gate driver 58.

The DAC 55 converts the command voltage VD1 or the command voltage VD2, which is a digital value output from the DSP 43, into an analog value, and outputs the result as a command voltage Vx (=VD1 or VD2).

The oscillator circuit 56 outputs an oscillator voltage Vosc of a triangular wave based on the clock signal Sck. Specifically, the oscillator circuit 56 outputs the oscillator voltage Vosc having an instantaneous value that increases when the clock signal Sck changes to a high level (hereinafter referred to as high) and decreases when the clock signal Sck changes to a low level (hereinafter referred to as low).

The comparator 57 (comparison unit) outputs a low signal when the command voltage Vx is higher than the oscillator voltage Vosc, and outputs a high signal when the command voltage Vx is lower than the oscillator voltage Vosc.

The gate driver 58 (output unit) outputs, to the terminal OUT, the drive signal Vg for turning on the NMOS transistor 26 based on the high signal output from the comparator 57 and turning off the NMOS transistor 26 based on the low signal. Thus, in an embodiment of the present disclosure, when the command voltage VD1, VD2 (or the command voltage Vx) rises, off-duty Doff of the NMOS transistor 26 increases.

Waveform of Inductor Current IL

Case where Inductor Current IL Continuously Flows

Figure 3:
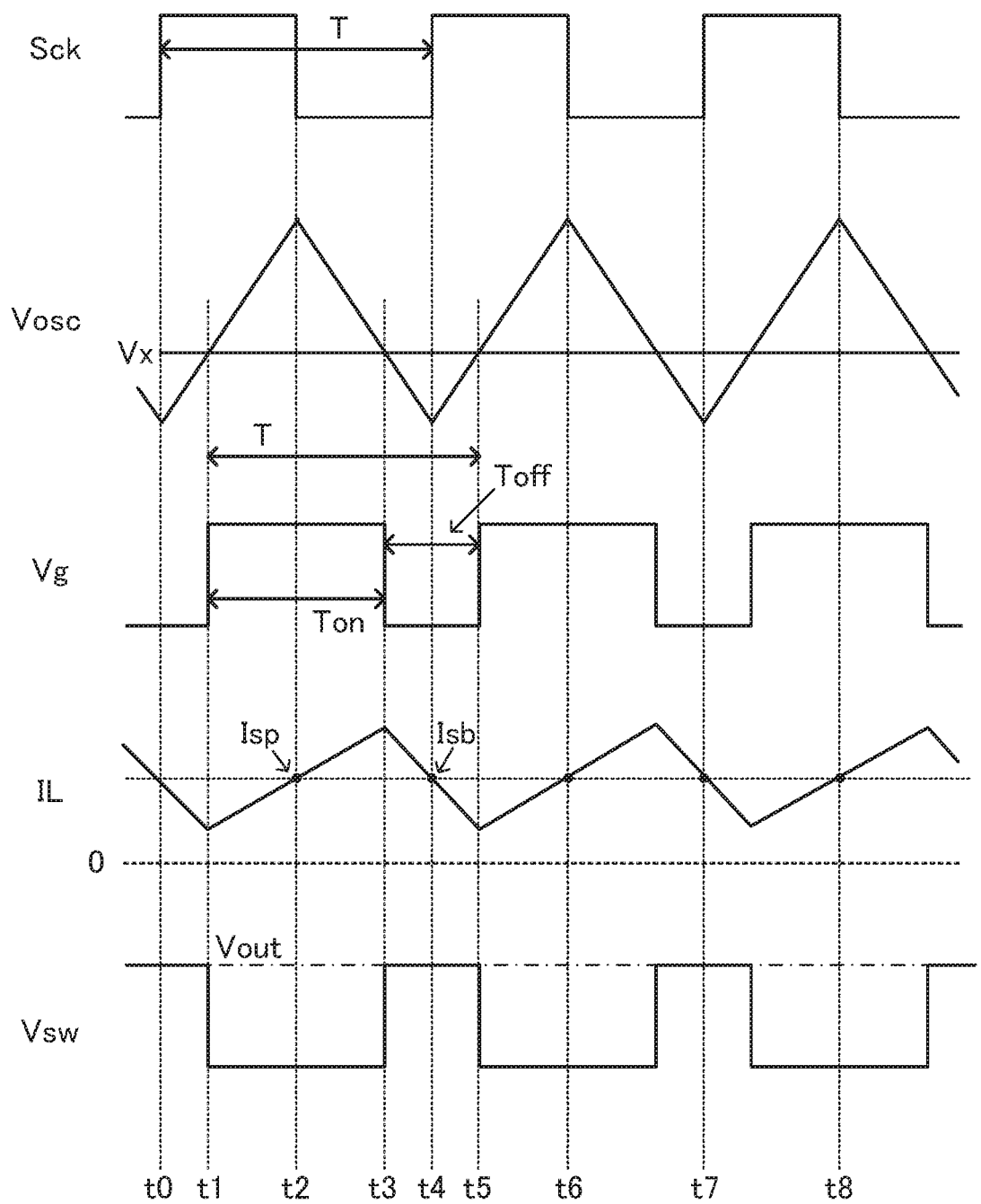
FIG. 3 is a diagram illustrating an example of a waveform in the case where an inductor current IL continuously flows.

FIG. 3 is a diagram illustrating an example of a waveform in the case where the inductor current IL continuously flows. For example, when the clock signal Sck goes high at time t0 in FIG. 3, the instantaneous value of the oscillator voltage Vosc increases. When the oscillator voltage Vosc becomes higher than the command voltage Vx at time t1, the drive signal Vg goes high and the NMOS transistor 26 is turned on. As a result, the inductor current IL increases and the voltage Vsw decreases to substantially 0 V. When the clock signal Sck goes low at time t2, the instantaneous value of the oscillator voltage Vosc decreases. When the oscillator voltage Vosc becomes lower than the command voltage Vx at time t3, the drive signal Vg goes low. As a result, the NMOS transistor 26 is turned off, the inductor current IL decreases, and the voltage Vsw changes to the level of the output voltage Vout.

At time t4 when the switching period T has elapsed from the time t0, the clock signal Sck goes high and thus the oscillator voltage Vosc increases. At time t5, the oscillator voltage Vosc becomes higher than the command voltage Vx, and thus the NMOS transistor 26 is turned on and the inductor current IL increases as is the case with the time t1. In the following time period from time t6 to time t8, the operation from the time t2 to the time t6 is repeated.

As explained above, the AD converter 42 samples the inductor current IL at the timing when the logic level of the clock signal Sck changes. Specifically, at timing (for example, the time t2) when the clock signal Sck goes low, the AD converter 42 samples the inductor current IL to acquire the inductor current IL as a sampling value Isp. At timing (for example, the time t4) when the clock signal Sck goes high, the AD converter 42 samples the inductor current IL to acquire the inductor current IL as a sampling value Isb.

The timing when the clock signal Sck goes low at the time t2 is at a peak of the triangular wave (at a time when the instantaneous value of the oscillator voltage Voc is the maximum). Thus, the timing when the sampling value Isp is acquired is in the middle of a time period in which the NMOS transistor 26 is ON (a time period during which the drive signal Vg is high). The timing in the middle of an ON period Ton corresponds to timing when a half (Ton/2) of the ON period Ton has elapsed since the NMOS transistor 26 has been turned on.

The timing when the clock signal Sck goes high at the time t4 is at a bottom of the triangular wave (at a time when the instantaneous value of oscillator voltage Vosc is the minimum). Thus, the timing when the sampling value Isb is acquired is in the middle of a time period in which the NMOS transistor 26 is OFF (a time period in which the drive signal Vg is low). The timing in the middle of an OFF period Toff corresponds to timing when a half (Toff/2) of the OFF period Toff has elapsed since the NMOS transistor 26 has been turned off.

When the inductor current IL has a continuous waveform, the inductor current IL increases in the ON period Ton of the NMOS transistor 26 (for example, the time t1 to the time t3) and decreases in the OFF period Toff (for example, the time t3 to the time t5) of the NMOS transistor 26. The amount of change (amount of increase) in the inductor current IL in the ON period Ton and the amount of change (amount of decrease) in the inductor current IL in the OFF period Toff are equal. Thus, when the inductor current IL has a continuous waveform, the sampling value Isp acquired in the middle of the ON period Ton (time t2) and the sampling value Isb acquired in the middle of the OFF period Toff (time t4) are equal.

Case where Inductor Current IL Intermittently Flows

Figure 4:
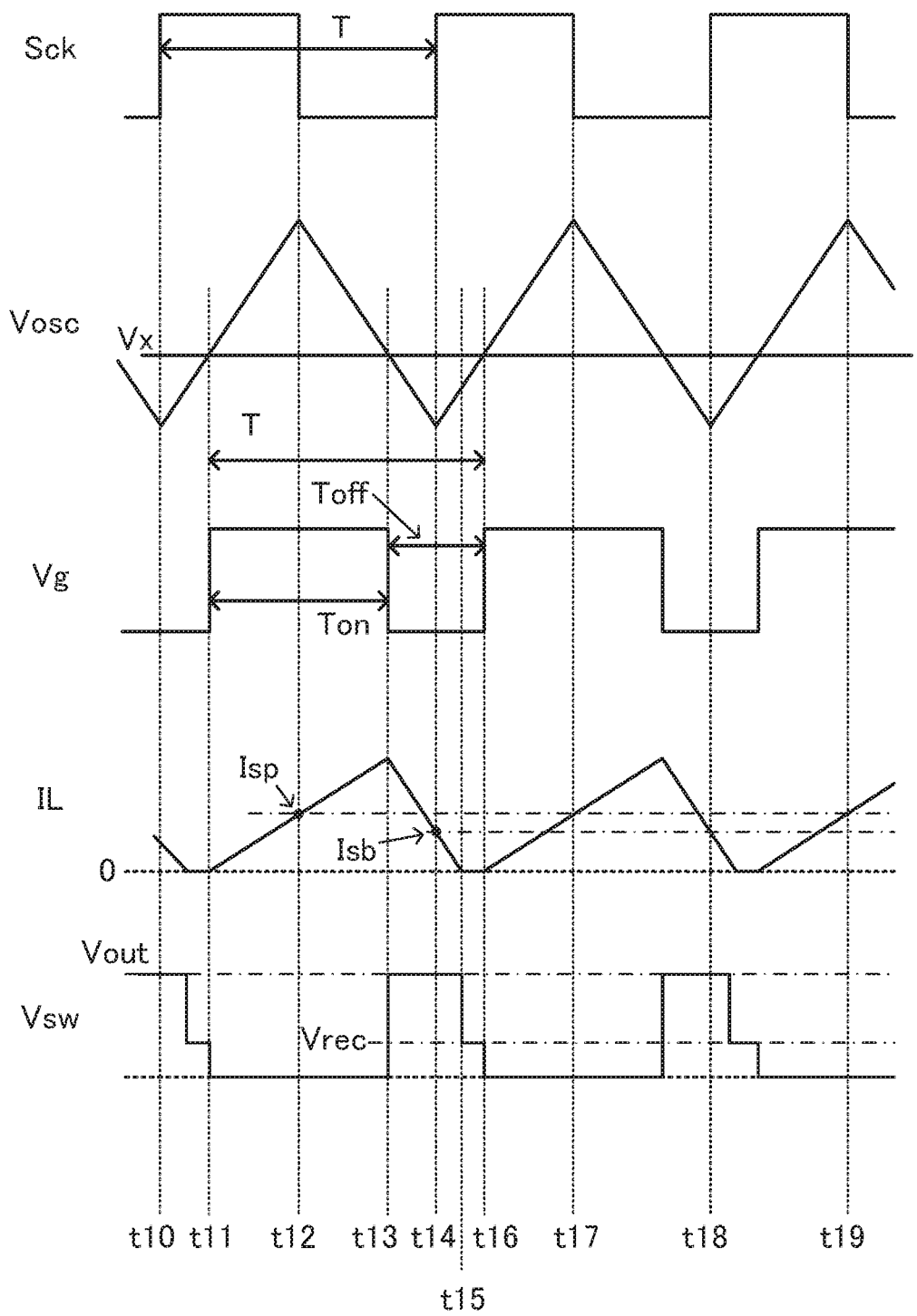
FIG. 4 is a diagram illustrating an example of a waveform in the case where an inductor current IL intermittently flows.

FIG. 4 is a diagram illustrating an example of a waveform in the case where the inductor current IL intermittently flows. When the clock signal Sck goes high at time t10 in FIG. 4, the instantaneous value of the oscillator voltage Vosc increases. When the oscillator voltage Vosc becomes higher than the command voltage Vx at time t11, the drive signal Vg goes high and the NMOS transistor 26 is turned on. As a result, the inductor current IL increases from zero.

When the clock signal Sck goes low at time t12, the instantaneous value of the oscillator voltage Vosc decreases. When the oscillator voltage Vosc becomes lower than the command voltage Vx at time t13, the drive signal Vg goes low. As a result, the NMOS transistor 26 is turned off and the inductor current IL decreases.

At time t14 when the switching period T has elapsed since the time t10, the clock signal Sck goes high, and thus the instantaneous value of the oscillator voltage Vosc increases. However, at this timing, since the NMOS transistor 26 is off, the inductor current IL decreases to zero at time t15.

When the oscillator voltage Vosc becomes higher than the command voltage Vx at time t16, the NMOS transistor 26 is turned on, and thus the inductor current IL increases from zero. Accordingly, the inductor current IL remains zero from the time t15 to the time t16 at the time when the oscillator voltage Vosc becomes higher than the command voltage Vx. In a time period from the time t15 to the time t16, the voltage Vsw drops from the voltage Vout to a voltage Vrec.

At time t17 when the clock signal Sck goes low, the instantaneous value of the oscillator voltage Vosc decreases as in the time t12. In a time period from the time t17 to time t19, the operation from the time 12 to the time t17 is repeated.

At timing when the clock signal Sck goes low (for example, the time t12), the AD converter 42 in an embodiment of the present disclosure samples the inductor current IL to acquire the inductor current IL as the sampling value Isp. At timing when the clock signal Sck goes high (for example, the time t14), the AD converter 42 samples the inductor current IL to acquire the inductor current IL as the sampling value Isb.

The time t12 is at a peak of the triangular wave (oscillator voltage Vosc). Thus, the timing when the sampling value Isp is acquired is in the middle of the ON period of the NMOS transistor 26.

The time t14 is at a bottom of the triangular wave (oscillator voltage Vosc). Thus, the timing when the sampling value Isb is acquired is in the middle of the OFF period of the NMOS transistor 26.

In the case where the inductor current IL has a discontinuous waveform, a change in the inductor current IL when the NMOS transistor 26 is ON and a change in the inductor current IL when the NMOS transistor 26 is OFF are equal under the same voltage conditions of the rectified voltage Vr and the output voltage Vout. However, the inductor current IL increases over the ON period Ton, but the inductor current IL becomes zero during a part (for example, the time t15 to the time t16) of the OFF period Toff (for example, the time t13 to the time t16). That is, the inductor current IL decreases to zero within a time period shorter than the OFF period Toff. Since the inductor current IL cannot take a negative value due to the circuit configuration, the current stops changing at this point in time.

Thus, when the inductor current IL has a discontinuous waveform, the sampling value Isp acquired in the middle of the ON period Ton (time t12) is different from the sampling value Isb acquired in the middle of the OFF period Toff (time t14).

Accordingly, as is apparent from FIGS. 3 and 4, it is possible to figure out whether the inductor current IL has a continuous waveform or a discontinuous waveform by acquiring the sampling values Isp and Isb.

Method for Calculating ON Period Ton in Discontinuous Mode

An explanation will be given of a method of calculating the ON period Ton for causing the inductor current IL to be similar in waveform to the rectified voltage Vr when the PFC circuit is operated in the discontinuous mode.

Figure 5:
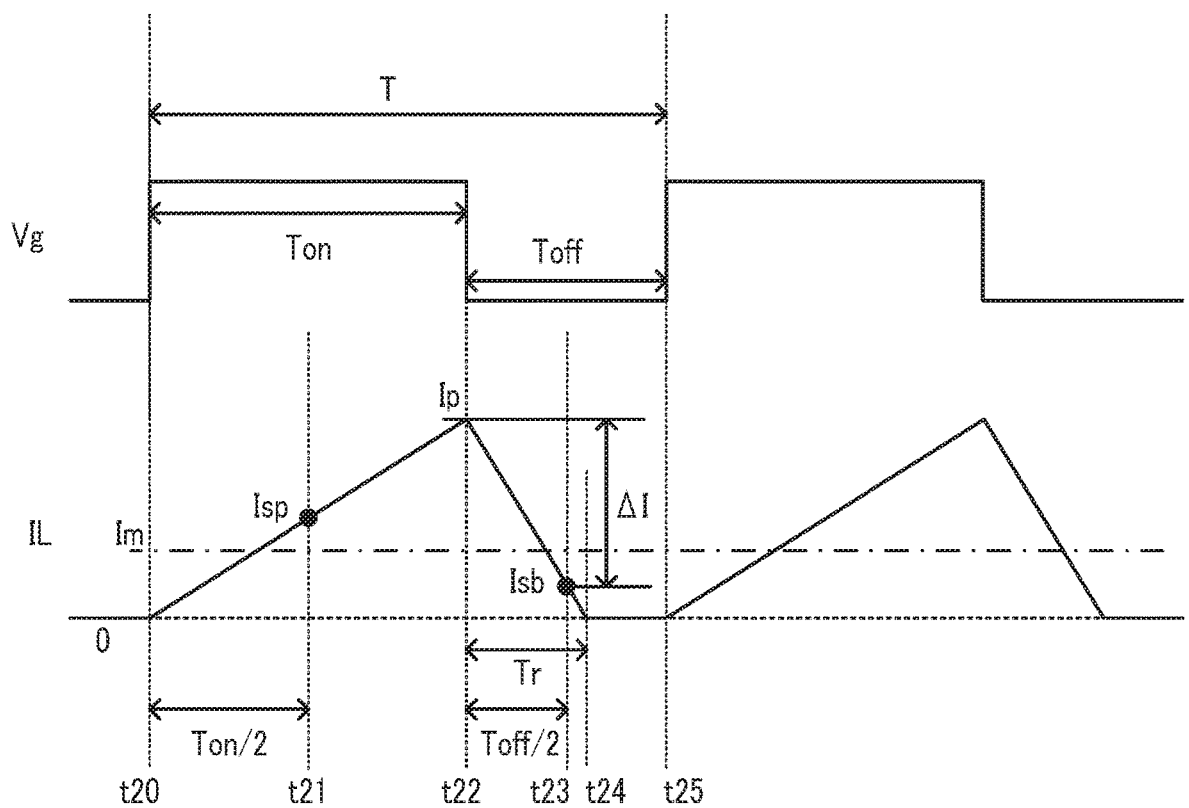
FIG. 5 is a diagram illustrating details of a waveform in the case where an inductor current IL intermittently flows.

FIG. 5 is a diagram for describing details of a waveform in the case where the inductor current IL has a discontinuous waveform. FIG. 5 is the same as an excerpt from FIG. 4. Thus, explanation of the clock signal Sck, the oscillator voltage Vosc, and the like is omitted.

First, when the drive signal Vg goes high at time t20, the inductor current IL increases from zero. At time t21 (first timing) when a half (Ton/2) of the ON period Ton has elapsed since the time t20, the inductor current IL is sampled to acquire the sampling value Isp (first current value).

At time t22 when a half (Ton/2) of the ON period Ton has elapsed since the time t21, the drive signal Vg goes low and the inductor current IL decreases. At time t23 (second timing) when a half (Toff/2) of the OFF period Toff has elapsed since the time t22, the inductor current IL is sampled to acquire the sampling value Isb (second current value).

At time t24, the inductor current IL decreases to zero. When the drive signal Vg goes high at time t25, the inductor current IL increases from zero.

When a peak current value of the inductor current IL at the time t22 is given as "Ip", the current value Ip is given by Expression (1).

$$IP = Vr \times (Ton/L) \quad (1)$$

where "Vr" is the rectified voltage Vr described above, and "L" is the inductance of the inductor 23.

A reset time Tr until the inductor current IL has decreased to zero is given by Expression (2).

$$Tr = L \times Ip / (Vout - Vr) \quad (2)$$
$$= (L \times Vr \times (Ton/L)) / (Vout - Vr)$$
$$= Ton \times Vr / (Vout - Vr)$$

An average current Im (average value) of the inductor current IL is given by Expression (3).

$$Im = Ip \times (Ton + Tr) / (2 \times T) \quad (3)$$
$$= ((Vr \times Vout) / ((Vout - Vr) \times 2 \times T \times L))) \times Ton2$$

When the average current Im is made proportional to the rectified voltage Vr, that is, when a waveform of the inductor current IL is caused to be similar in waveform to the rectified voltage Vr, those other than the rectified voltage Vr in Expression (3) needs to be a constant "k". That is, variables and the like included in Expression (3) need to satisfy the relation of Expression (4).

$$(Vout/(Vout-Vr) \times 2 \times T \times L))) \times Ton2 = k \quad (4)$$

In such a case, Expression (3) results in Im=Vr×k. From Expression (4), the ON period Ton is calculated as follows:

$$Ton = (2 \times T \times L \times k(1 - Vr/Vout))^{1/2} \quad (5)$$

When the switching period T is constant and a change in the inductance L caused by DC superimposition can be ignored, and when assuming that a coefficient "2×T×L×k" is a coefficient "a", Expression (5) results in Expression (6).

$$Ton = a \times (1 - Vr/Vout)^{1/2} \quad (6)$$

When a value obtained by normalizing "Vr/Vout" is given as "Vrm" in Expression (6), Expression (6) results in Expression (7).

$$Ton = a \times (1 - Vrm)^{1/2} \quad (7)$$

As explained in detail below, since the coefficient "k" is a coefficient corresponding to an amplitude command value of the average current Im, Expression (5) holds the coefficient "k", even if the inductance L is unknown. Thus, when the switching period T is constant, it is possible to calculate the ON period Ton for causing the inductor current IL to be similar in waveform to the rectified voltage Vr, by substituting the rectified voltage Vr and the output voltage Vout into Expression (6).

Method for Calculating Rectified Voltage Vr in Discontinuous Mode

As explained above, in order to calculate the ON period Ton for causing the inductor current IL to be similar in waveform to the rectified voltage Vr, the rectified voltage Vr needs to be figured out. A method for calculating the rectified voltage Vr will be explained below with reference to FIG. 5.

First, in the discontinuous mode, the inductor current IL increases from zero. The sampling value Isp is acquired in the middle (Ton/2) of the ON period Ton. Thus, Expression (8) holds based on the amount of change (amount of increase from zero to the current value Isp) in the inductor current IL in a predetermined time period (Ton/2).

$$L \times Isp = Vr \times (Ton/2) \quad (8)$$

From Expression (8), the rectified voltage Vr is given by Expression (9).

$$Vr = (2 \times L \times Isp)/Ton \quad (9)$$

Thus, if the inductance L of the inductor 23 can be obtained from Expression (9), the rectified voltage Vr can be calculated.

Method for Calculating Inductance L

A method for calculating the inductance L of the inductor 23 will be explained. When the amount of decrease in the inductor current IL from a start of the OFF period Toff (time t22) to the time t23 is given as ΔI, Expression (10) holds.

$$L \times \Delta I = (Vout - Vr) \times (Toff/2) \quad (10)$$

When Expression (9) is substituted into Expression (10), Expressions (11) and (12) are obtained.

$$L \times \Delta I = Vout \times (Toff/2) - L \times Isp \times (Toff/Ton) \quad (11)$$

$$L \times (\Delta I + Isp \times (Toff/Ton)) = Vout \times (Toff/2) \quad (12)$$

The time t23 is timing when a half of the OFF period Toff has elapsed since the time t22 and the sampling value Isb is acquired. Thus, the relation of Expression (13) holds between ΔI and the sampling values Isp and Isb.

$$\Delta I = 2 \times Isp - Isb \quad (13)$$

Thus, the inductance L is calculated by the following Expression (14).

$$L=(Vout \times (Toff/2))/((2+Toff/Ton) \times Isp-Isb) \quad (14)$$

Thus, the inductance L is calculated based on the sampling value Isp acquired at the timing of the time t21 (Ton/2) in the ON period Ton and the sampling value Isb acquired at the timing of the time t23 (Toff/2) in the OFF period Toff.

Expression (14) holds only when the sampling value Isb acquired at the OFF period Toff is positive (Isb>0), that is, the sampling value Isb is not zero.

When the inductance L is obtained by Expression (14), the rectified voltage Vr is calculated from Expression (9). Further, when the rectified voltage Vr is calculated, the ON period Ton for causing the inductor current IL to be similar in waveform to the rectified voltage Vr can be calculated from Expression (6).

DSP 43

Figure 6:
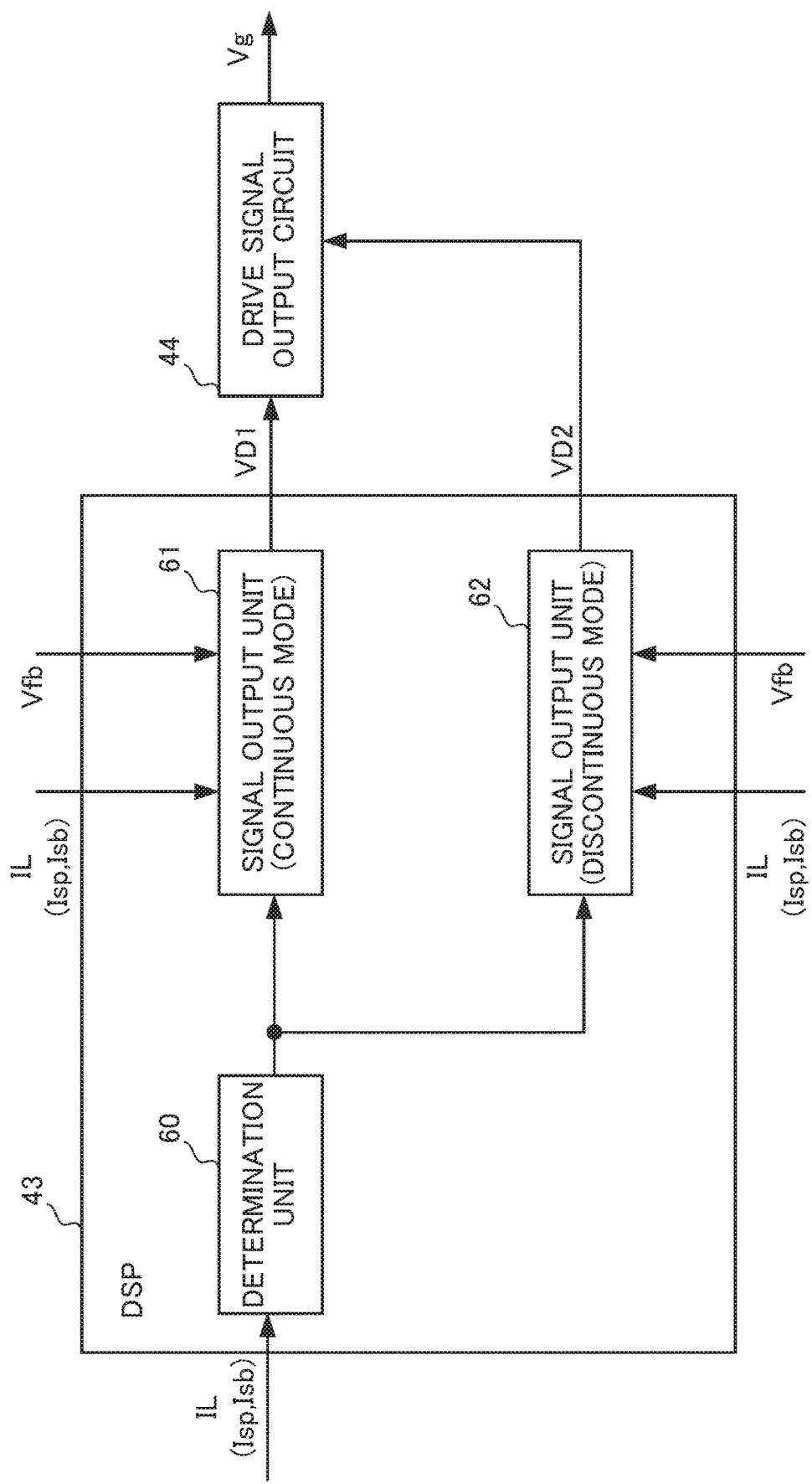
FIG. 6 is a diagram illustrating an example of blocks implemented in a DSP 43.

FIG. 6 is an example of blocks implemented in the DSP 43. The DSP core 50 executes predetermined programs, thereby implementing a determination unit 60 and signal output units 61 and 62 in the DSP 43.

The determination unit 60 determines, based on the inductor current IL, whether the AC-DC converter 10 is operated as the PFC circuit in the continuous mode or operated as the PFC circuit in the discontinuous mode. Specifically, when a difference between the sampling value Isp and the sampling value Isb is smaller than a predetermined value X1 (for example, 0.1 mA), the determination unit 60 determines that the inductor current IL has a continuous waveform and operates the signal output unit 61 for the continuous mode. On the other hand, when the difference between the sampling value Isp and the sampling value Isb is larger than the predetermined value X1, the determination unit 60 determines that the inductor current IL has a discontinuous waveform and operates the signal output unit 62 for the discontinuous mode.

The signal output unit 61 (first signal output unit) generates, based on the feedback voltage Vfb and the inductor current IL, the command voltage VD1 (first signal) for operating the AC-DC converter 10 as the PFC circuit in the continuous mode.

The signal output unit 62 (second signal output unit) generates, based on the feedback voltage Vfb and the inductor current IL, the command voltage VD2 (second signal) for operating the AC-DC converter 10 as the PFC circuit in the discontinuous mode.

In an embodiment of the present disclosure, the feedback voltage Vfb is an output voltage feedback value output from the AD converter 41. However, for convenience, the output voltage feedback value is simply referred to as the feedback voltage Vfb.

Details of Signal Output Unit 61

Figure 7:
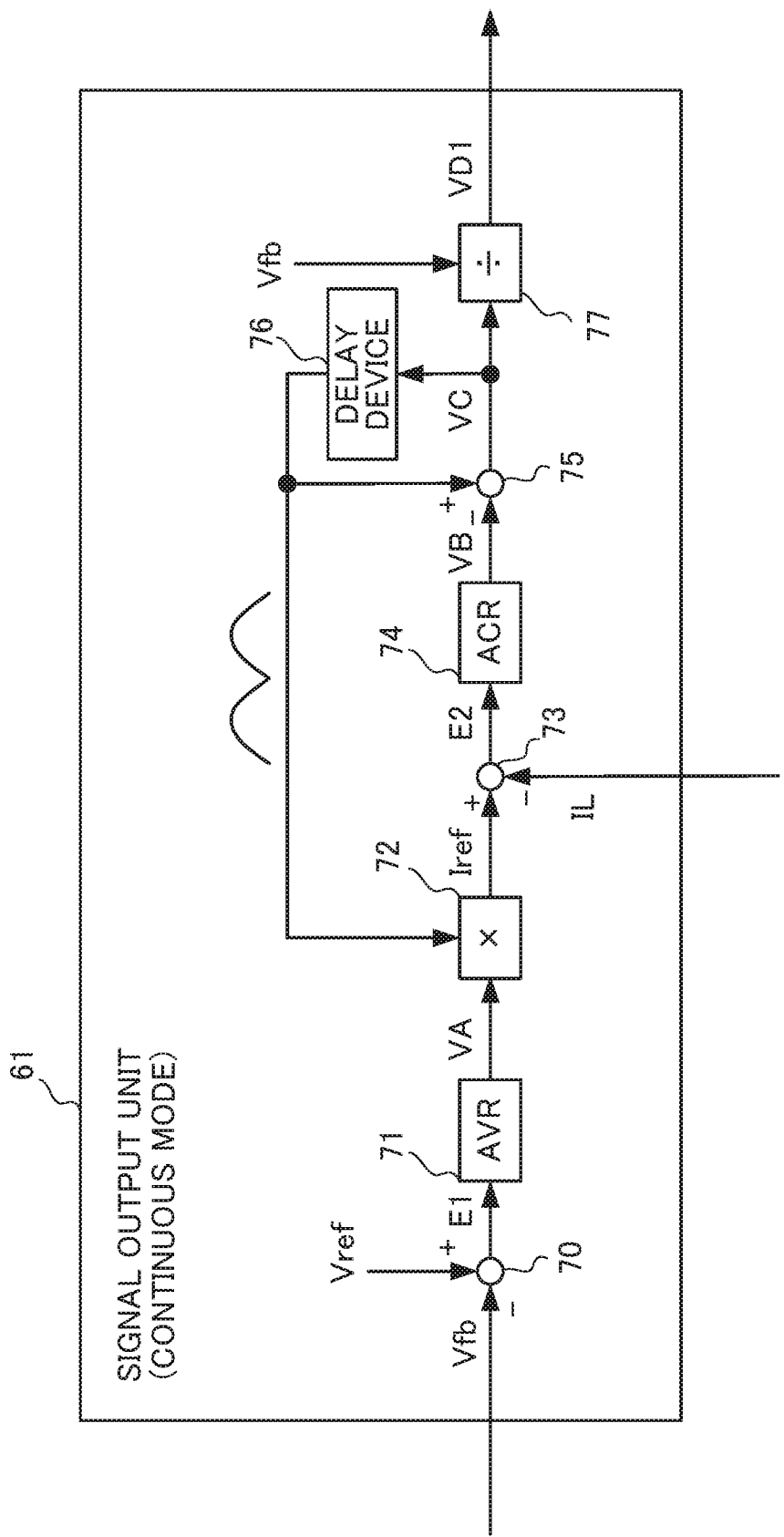
FIG. 7 is a diagram illustrating an example of a signal output unit 61.

FIG. 7 is an example of a processing flow (so-called signal flowchart) with functional blocks implemented in the signal output unit 61. The signal output unit 61 generates the command voltage VD1 serving as a reference of the drive signal Vg based on the feedback voltage Vfb and the inductor current IL.

The signal output unit 61 includes subtractors 70, 73, and 75, a voltage regulator (AVR: Automatic Voltage Regulator) 71, a multiplier 72, a current regulator 74 (ACR: Automatic Current Regulator), a delay device 76, and a divider 77.

The subtractor 70 subtracts the feedback voltage Vfb from a reference voltage Vref serving as a reference of the output voltage Vout (for example, 400 V) at the target level and calculates an error E1 between the reference voltage Vref and the feedback voltage Vfb.

The voltage regulator 71 outputs, according to the error E1, a command voltage VA for causing the feedback voltage Vfb to reach the reference voltage Vref.

The multiplier 72 multiplies the command voltage VA and an output from the delay device 76 explained below together and outputs the multiplication result as a reference current Iref serving as the reference of the inductor current IL. In an embodiment of the present disclosure, the reference current Iref is a current command value output from the multiplier 72. However, for convenience, the current command value is simply referred to as the reference current Iref.

The subtractor 73 subtracts the inductor current IL from the reference current Iref and calculates an error E2 between the reference current Iref and the inductor current IL.

The current regulator 74 outputs, according to the error E2, a command voltage VB for causing the inductor current IL to reach the current value of the reference current Iref. The current regulator 74 in an embodiment of the present disclosure outputs a positive command voltage VB when the reference current Iref is larger than the inductor current IL and outputs a negative command voltage VB when the reference current Iref is smaller than the inductor current IL.

The subtractor 75 subtracts the command voltage VB from an output of the delay device 76 and calculates a command voltage VC. As explained in detail below, the output of the delay device 76 is a previously output command voltage VC.

The delay device 76 delays the command voltage VC by a predetermined time period (for example, a time period per one sample of the DSP 43) and outputs the command voltage VC.

The current regulator 74 and the subtractor 75 output the command voltage VC for causing the inductor current IL to reach the current value of the reference current Iref. Specifically, the current regulator 74 and the subtractor 75 output the command voltage VC for increasing the inductor current IL when the inductor current IL is smaller than the reference current Iref and reducing the inductor current IL when the inductor current IL is larger than the reference current Iref.

The subtractor 75 subtracts (adds if the command voltage VB is negative), from (to) the command voltage VC of the immediately preceding sample, the command voltage VB needed for causing the inductor current IL to reach the reference current Iref and outputs the command voltage VC as a new command voltage VC. With such a configuration, the current regulator 74 does not need to greatly change the command voltage VB. Thus, a control characteristic in a current feedback loop is improved.

The divider 77 is a block for dividing the command voltage VC by a voltage (for example, the feedback voltage Vfb) obtained by dividing the output voltage Vout.

Operation (Continuous Mode) of Power Factor Correction IC 25 Using Signal Output Unit 61

An explanation will be given of an operation of the power factor correction IC 25 using the signal output unit 61 when the determination unit 60 has determined that the inductor current IL has a continuous waveform. First, an explanation will be given of an operation concerning a current loop and a voltage loop, in a feedback loop of the power factor correction IC 25.

Current Loop

For example, when the operation of the power factor correction IC 25 is started, the voltage regulator 71 of the signal output unit 61 outputs the command voltage VA according to the error E1, and the multiplier 72 outputs the reference current Iref according to the command voltage VA.

For example, when the reference current Iref is larger than the inductor current IL, a positive command voltage VB is output from the current regulator 74. As a result, the subtractor 75 subtracts the positive command voltage VB from the previously output command voltage VC. Thus, the command voltage VC output from the subtractor 75 drops. The divider 77 divides the command voltage VC by, for example, the feedback voltage Vfb. Thus, the command voltage VD1 also drops. The feedback voltage Vfb is substantially constant in a time period in which the divider 77 executes division processing (for example, a time period equivalent to one sample of the DSP 43).

As a result, since the voltage Vx also drops, a duty ratio Doff decreases (that is, a time period in which the NMOS transistor 26 is ON increases), so that the inductor current IL increases to reach the reference current Iref consequently.

On the other hand, for example, when the reference current Iref is smaller than the inductor current IL, a negative command voltage VB is output from the current regulator 74. As a result, the subtractor 75 adds the command voltage VB to the previously output command voltage VC, so that the command voltage VC rises. As a result, since the command voltage VD1 and the command voltage Vx also rise, the duty ratio Doff increases (that is, the time period in which the NMOS transistor 26 is ON decreases), so that the inductor current IL decreases to reach the reference current Iref consequently.

That is, in the power factor correction IC 25, the current loop is formed such that the inductor current IL will reach the reference current Iref. An operation for causing the inductor current IL to reach the reference current Iref, serving as a target value, is performed at the level of the instantaneous value of the reference current Iref. Thus, as explained in detail below, if the reference current Iref is a rectified sinusoidal waveform, the inductor current IL will have a similar waveform.

Voltage Loop

Next, an explanation will be given of an operation concerning the voltage loop in the feedback loop of the power factor correction IC 25. When an average value of the rectified voltage Vr is constant and the output voltage Vout rises from the target level (for example, 400 V), the feedback voltage Vfb also rises. When the command voltage VA drops with a rise in the feedback voltage Vfb, an average value of the reference current Iref also decreases. As a result, an average value of the inductor current IL also decreases and the amount of charge on the capacitor 22 decreases, and thus the output voltage Vout drops.

On the other hand, when the average value of the rectified voltage Vr is constant and the output voltage Vout drops from the target level, the feedback voltage Vfb also drops. When the command voltage VA rises with a drop in the feedback voltage Vfb, the average value of the reference current Iref also increases. As a result, the average value of the inductor current IL increases and the amount of charge on the capacitor 22 increases, and thus the output voltage Vout rises.

In this way, the power factor correction IC 25 performs feedback control such that the output voltage Vout reaches the target level.

Power Factor Correction

As explained above, the current loop and the voltage loop are formed as the feedback loop in the power factor correction IC 25 using the signal output unit 61. That is, the power factor correction IC 25 is a control circuit of a current mode control type.

The control circuit of the current mode control type controls a direct current or a low frequency component of the inductor current IL so as to be a value close to the reference current Iref. On the other hand, direct-current impedance or low-frequency impedance of the inductor 23 in FIG. 1 is designed to be extremely small, and its direct-current voltage or low-frequency component voltage is negligibly small. That is, it is possible to utilize a principle that "Vr≈Vsw(ave) may be assumed as an approximate value".

Under a condition that the output voltage Vout is constant, it is possible to estimate the rectified voltage Vr by figuring out the duty ratio Doff, that is, the command voltage Vx, instead of the average voltage Vsw (ave). Similarly, in the power factor correction IC 25 using the signal output unit 61 that controls the output voltage Vout so as to be constant, the current voltage Vr and the command voltages VC and VD1 have similar waveforms.

In an embodiment of the present disclosure, the command voltage VC similar in waveform to the rectified voltage Vr is input to the multiplier 72. The multiplier 72 sets the multiplication result of the command voltage VA and the command voltage VC as the reference current Iref. As a result, the waveform of the reference current Iref will also be a rectified sinusoidal waveform similar to the waveform of the rectified voltage Vr. Accordingly, the power factor of a power supply is improved.

Incidentally, the output voltage Vout has been explained as being constant, however, in actuality, the instantaneous value of the output voltage Vout may not be regarded as being constant, due to being affected by a ripple voltage when the capacitor 22 smooths a voltage output from the diode 24. Specifically, the output voltage Vout in an embodiment of the present disclosure includes a ripple component (ripple voltage) due to a change in the instantaneous value of the AC voltage Vac, which is a commercial power supply. In general, the double frequency component of the AC voltage Vac is predominant. Thus, the command voltage VC generated by the feedback voltage Vfb that is obtained by dividing the output voltage Vout also includes a ripple component at the double frequency of the AC voltage Vac.

A specific explanation will be given of an operation when the command voltage VC is divided by the feedback voltage Vfb. For example, the output voltage Vout and the feedback voltage Vfb may be larger than the average values by 10% due to the ripple component explained above. When the divider 77 divides the command voltage VC by "1.1" at timing when the feedback voltage Vfb is 1.1 times of the average value, the command voltage VD1 is expressed by VD1=VC×(1/1.1). Thus, the duty ratio "Doff" in an OFF period also results in "1/1.1" times.

However, in this case, the amplitude of the voltage Vsw is also 1.1 times similarly to the output voltage Vout, and thus an average voltage Vsw(ave) is the same as the average voltage Vsw(ave) when the output voltage Vout is at a desired level. Accordingly, a proportional relationship between the command voltage VC and the rectified voltage Vr is maintained.

In this way, the divider 77 divides the command voltage VC by, for example, the feedback voltage Vfb, and thus a ripple component in the command voltage VC is suppressed.

Since a waveform of the command voltage VC becomes similar to the waveform of the rectified voltage Vr, a waveform of the reference current Iref results in being similar to the waveform of the rectified voltage Vr. As a result, in an embodiment of the present disclosure, even when the output voltage Vout is affected by the ripple component, the power factor of the power supply is improved.

Details of Signal Output Unit 62

Figure 8:
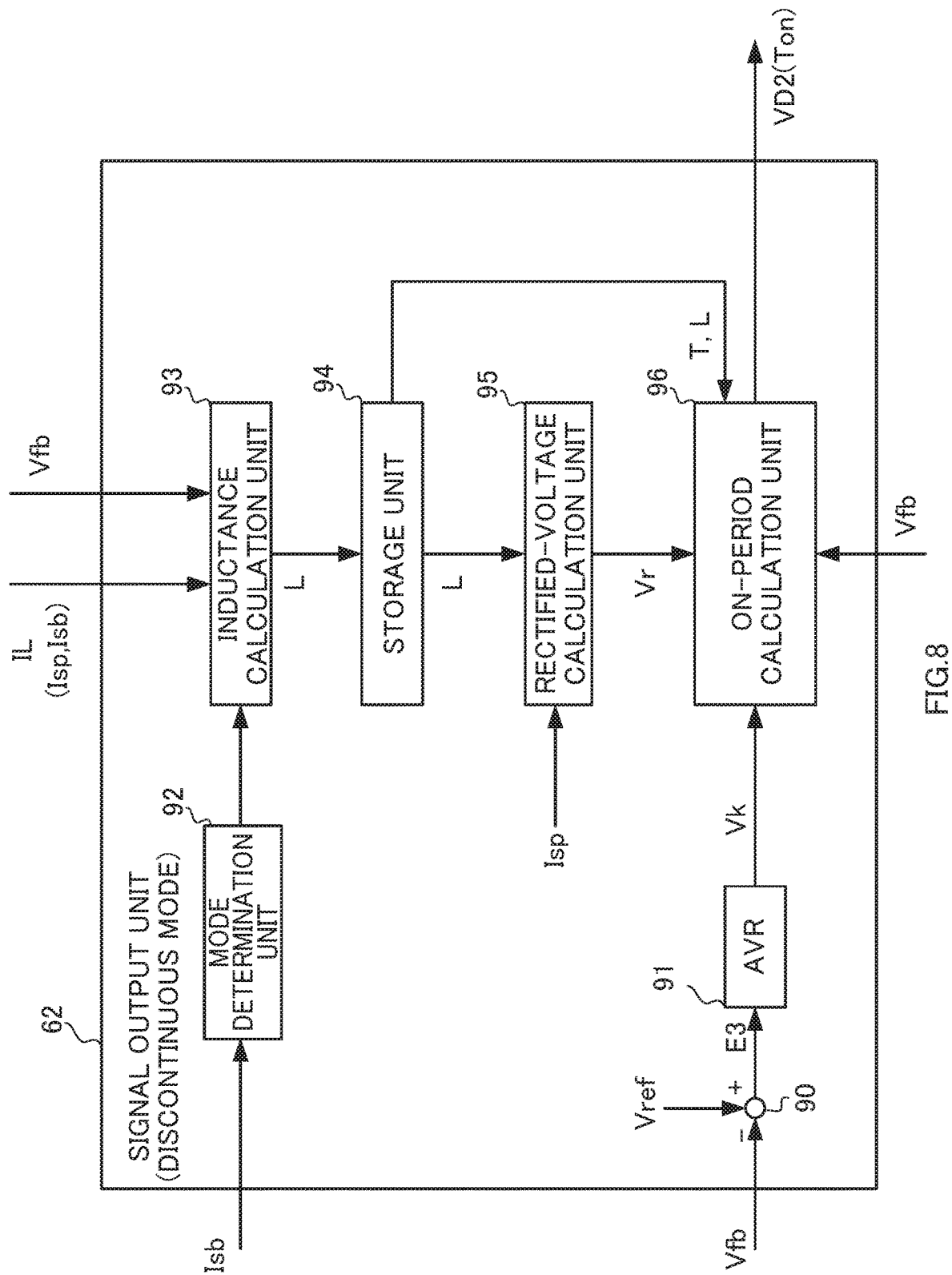
FIG. 8 is a diagram illustrating an example of a signal output unit 62.

FIG. 8 is a diagram illustrating an example of blocks included in the signal output unit 62. When the PFC circuit is operated in the discontinuous mode, the signal output unit 62 generates the command voltage VD2 for causing the inductor current IL to be similar in waveform to the rectified voltage Vr while causing the output voltage Vout to reach the target level. The signal output unit 62 includes a subtractor 90, a voltage regulator (AVR) 91, a mode determination unit 92, an inductance calculation unit 93, a storage unit 94, a rectified-voltage calculation unit 95, and an ON-period calculation unit 96.

The subtractor 90 subtracts the feedback voltage Vfb from the reference voltage Vref serving as the reference of the output voltage Vout (for example, 400 V) at the target level, and calculates an error E3 between the reference voltage Vref and the feedback voltage Vfb.

The voltage regulator 91 outputs a command value Vk for causing the feedback voltage Vfb to reach the reference voltage Vref, according to the error E3. As explained in detail below, the command value Vk corresponds to the coefficient "k" explained in Expression (4). The subtractor 90 and the voltage regulator 91 correspond to a command-value output unit.

The mode determination unit 92 determines whether the inductance L of the inductor 23 can be calculated, based on the sampling value Isb of the inductor current IL. Specifically, when the sampling value Isb is not zero, Expression (14) described above can be calculated. Thus, when the sampling value Isb is larger than a predetermined value X2 (for example, 0.1 A) that is slightly larger than zero, the mode determination unit 92 determines that a mode is such a mode that the inductance L can be calculated (hereinafter referred to as the "mode A"). When the sampling value Isb is smaller than the predetermined value X2, the mode determination unit 92 determines that the mode is such a mode that the inductance L cannot be calculated (hereinafter referred to as the "mode B").

The inductance calculation unit 93 calculates the inductance L based on the sampling value Isp, the sampling value Isb, and the feedback voltage Vfb. The inductance L is calculated based on Expressions (8) to (14) described above.

The storage unit 94 stores the inductance L calculated by the inductance calculation unit 93 and the switching period T. The inductance calculation unit 93 updates information stored in the storage unit 94 every time the inductance calculation unit 93 calculates the inductance L.

The rectified-voltage calculation unit 95 calculates the rectified voltage Vr based on the inductance L stored in the storage unit 94 and the sampling value Isp acquired after the time period Ton/2 has elapsed since the start of the ON period Ton. The rectified voltage Vr is calculated based on Expression (9) described above.

The ON-period calculation unit 96 calculates the ON period Ton based on the command value Vk, the feedback voltage Vfb, the rectified voltage Vr, the switching period T, and the inductance L. The ON-period calculation unit 96 calculates The ON period Ton based on Expression (6) described above. The ON-period calculation unit 96 outputs the command value VD2 corresponding to the calculated ON period Ton to cause the ON period of the NMOS transistor 26 to reach the calculated ON period Ton based on the instantaneous value of the oscillator voltage Vosc, for example. As a result, when the PFC circuit is operated in the discontinuous mode, the above described expression Im=Vr×k holds. Thus, the average current Im of the inductor current IL becomes similar in waveform to the rectified voltage Vr.

Voltage Loop

The voltage loop of the signal output unit 62 will be explained. When the output voltage Vout is lower than the target level, that is, when the feedback voltage Vfb is lower than the reference voltage Vref, the voltage regulator 91 increases the command value Vk according to the error E3. Since the command value Vk corresponds to the coefficient "k" explained in Expression (4), the ON time Ton becomes longer as the command value Vk (coefficient "k") increases. Thus, the inductor current IL increases. As a result, the output voltage Vout rises.

On the other hand, when the output voltage Vout is higher than the target level, that is, when the feedback voltage Vfb is higher than the reference voltage Vref, the voltage regulator 91 reduces the command value Vk according to the error E3. When the command value Vk (coefficient "k") decreases, the ON period Ton becomes shorter as the inductor current IL decreases. As a result, the output voltage Vout drops. In this way, the signal output unit 62 can cause the output voltage Vout to reach the target level.

Processing Executed by Power Factor Correction IC 25

Figure 9:
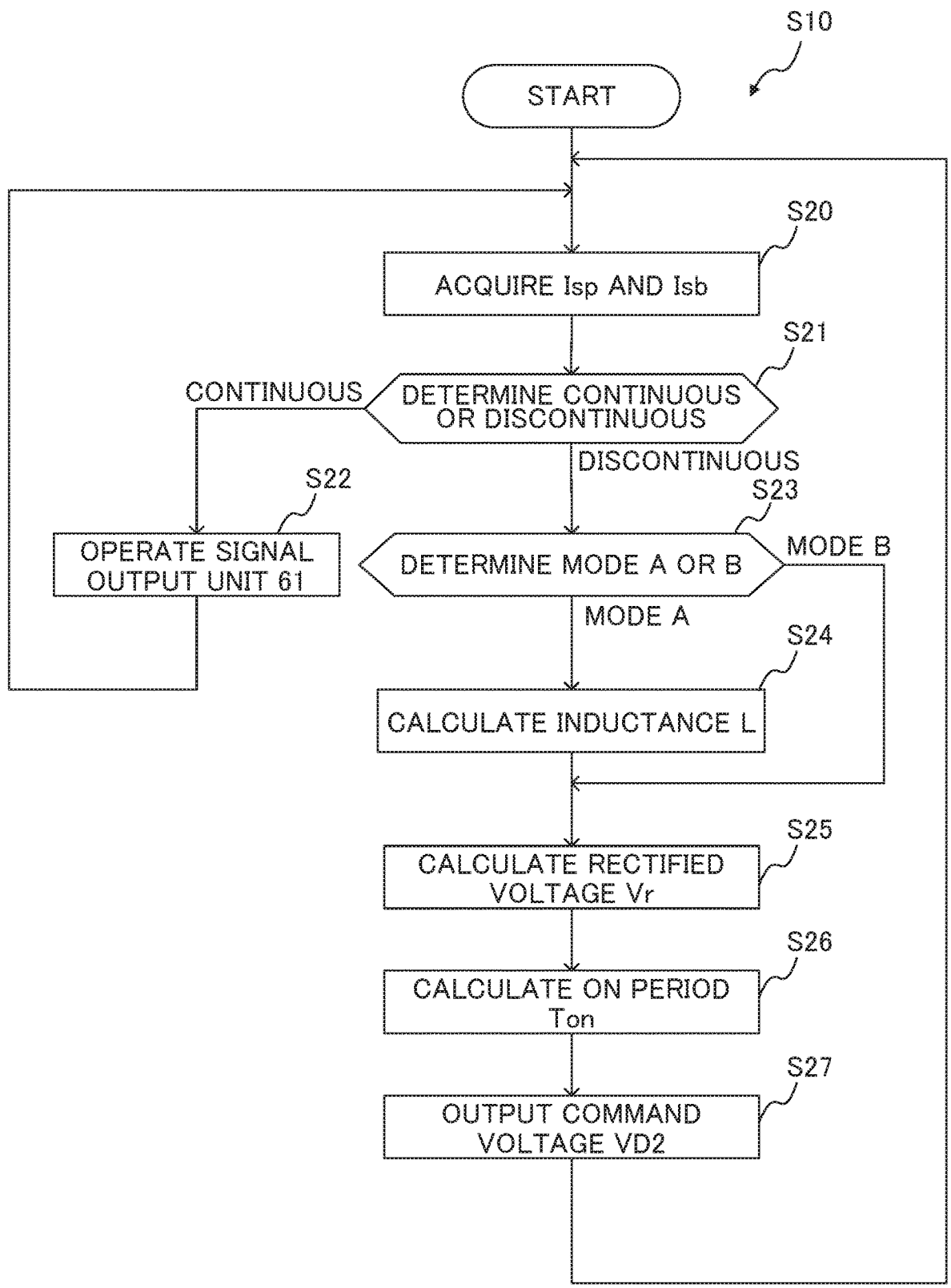
FIG. 9 is a flowchart illustrating an example of processing executed by a power factor correction IC 25.

FIG. 9 is a flowchart illustrating an example of process S10 executed in the power factor correction IC 25. First, every time the inductor current IL is sampled at the AD converter 42 of the DSP 43, the determination unit 60 acquires the sampling values Isp and Isb (S20). Then, the determination unit 60 determines whether the inductor current IL has a continuous waveform or a discontinuous waveform (S21) based on whether the difference between the sampling value Isp and the sampling value Isb is larger than the predetermined value X1. When having determined that the inductor current IL has a continuous waveform (continuous in S21), the determination unit 60 operates the signal output unit 61 (S22). As a result, the command voltage VD1 is output from the signal output unit 61. Thus, the AC-DC converter 10 operates as the PFC circuit in the continuous mode.

On the other hand, when the determination unit 60 determine that the inductor current IL has a discontinuous waveform (discontinuous in S21), the mode determination unit 92 of the signal output unit 62 determines whether the current mode is the mode A in which the inductance L can be calculated or the mode B in which the inductance L cannot be calculated (S23) based on the sampling value Isb.

When the mode determination unit 92 determines that the current mode is the mode A (mode A in S23), the inductance calculation unit 93 calculates the inductance L and stores the calculation result in the storage unit 94 (S24).

The inductance L may change according to a direct current or a low frequency current flowing through the inductor 23. However, when the current mode is the mode A, the inductance L is calculated every time the inductor current IL is sampled. As explained above, a sampling frequency of the AD converter 42 is, for example, 100 to 200 kHz, which is sufficiently higher than 50 to 60 Hz of the AC voltage Vac.

Thus, in an embodiment of the present disclosure, even when the inductance L changes, it is possible to accurately calculate the inductance L.

When the inductance L is calculated in the process S24 or the mode determination unit 92 determines that the current mode is the mode B (mode B in S23), the rectified-voltage calculation unit 95 calculates the rectified voltage Vr based on the inductance L and the sampling value Isp (S25).

When the rectified voltage Vr is calculated, the ON-period calculation unit 96 calculates the ON period Ton based on the rectified voltage Vr, the switching period T, the inductance L, the command voltage Vk, and the feedback voltage Vfb corresponding to the output voltage Vout (S26). The ON-period calculation unit 96 outputs the command voltage VD2 corresponding to the ON period Ton such that switching of the NMOS transistor 26 is performed in the calculated ON period Ton (S27). As a result, the AC-DC converter 10 operates as the PFC circuit in the discontinuous mode.

In this way, the DSP 43 of the power factor correction IC 25 executes the process S10 every time the inductor current IL is sampled. In the AC-DC converter 10, in both of the continuous mode and the discontinuous mode, the waveform of the inductor current IL is similar to the waveform of the rectified voltage Vr, and the power factor is improved.

Summary

The AC-DC converter 10 in an embodiment of the present disclosure has been explained above. The inductance calculation unit 93 of the DSP 43 calculates the inductance L based on the sampling value Isp, which is acquired at the timing (first timing: for example, the time t21) when the time period Ton/2 has elapsed since the inductor current IL has started to increase from zero, the sampling value Isb, which is acquired at the timing (second timing: for example, the time t23) when the time period Toff/2 has elapsed since the inductor current IL has started to decrease, and the feedback voltage Vfb. Further, the ON-period calculation unit 96 calculates the ON period Ton based on the calculated inductance L. Thus, the power factor correction IC 25 can cause the inductor current IL to be precisely similar in waveform to the rectified voltage Vr even when the inductance L changes due to the inductor current IL. Accordingly, the power factor correction IC 25 is capable of improving the power factor.

As illustrated in FIG. 5, the inductance calculation unit 93 calculates the inductance L based on a time period until when the sampling value Isp has been acquired (Ton/2: the first time period), a time period until when the sampling value Isb has been acquired (Toff/2: the second time period), and the sampling values Isp and Isb (see Expressions (8) to (14)). Thus, the inductance L can be calculated by acquiring the sampling values Isp and Isb in the ON period Ton and OFF period Toff, even if the rectified voltage Vr is unknown.

The inductance of the inductor 23 changes according to the inductor current IL, and the current value (for example, the average current value) of the inductor current IL becomes similar in waveform to the rectified voltage Vr. Thus, the inductance L when the amplitude of the rectified voltage Vr is low and the inductance L when the amplitude of the rectified voltage Vr is high are greatly different in value. As has been described above, the inductance calculation unit 93 calculates the inductance L at intervals each (a sampling period of the AD converter 42) being shorter than a quarter cycle of the AC voltage (a time period during which the rectified voltage Vr changes from zero to a peak). Accordingly, in an embodiment of the present disclosure, even when the inductance L is greatly changes, the ON period Ton corresponding to the changed inductance L is calculated based on a change in the rectified voltage. As a result, the power factor of the PFC circuit is improved.

The inductance L is calculated at intervals each corresponding to a half of the switching period T (a double frequency (100 to 200 kHz) of a switching frequency), for example. Accordingly, it is possible to calculate the optimal ON period Ton in each switching period.

In an embodiment of the present disclosure, the drive signal Vg for turning on and off the NMOS transistor 26 is generated based on the oscillator voltage Vosc of the triangular wave and the command voltage Vx. In the triangular wave, a rising period in which the instantaneous value increases and a falling period in which the instantaneous value decreases are equal. Thus, a peak (including a peak on the bottom side) of the triangular wave is in the middle of the ON period Ton or the OFF period Toff. In an embodiment of the present disclosure, the inductor current IL is sampled at timing of the peak of the triangular wave after the NMOS transistor 26 is turned on. Accordingly, the sampling value Isp is acquired always at the timing after the time period Ton/2 has elapsed since the start of the ON period Ton, and thus the DSP 43 does not need to calculate such timing.

Further, as has been described above, when the sampling value Isb is zero, the inductance L cannot be calculated in theory. The inductance calculation unit 93 calculates the inductance L only when the sampling value Isb is larger than the predetermined value X2, and updates the information of the storage unit 94 (for example, the mode A in S23). Accordingly, in an embodiment of the present disclosure, the inductance L is prevented from being erroneously calculated.

The DSP 43 includes: the signal output unit 61 for operating the AC-DC converter 10 as the PFC circuit in the continuous mode; and the signal output unit 62 for operating the AC-DC converter 10 as the PFC circuit in the discontinuous mode. Thus, even when the inductor current IL has a continuous waveform or a discontinuous waveform, it is possible to improve the power factor.

In an embodiment of the present disclosure, the DSP 43 executes the programs to implement the subtractor 70 and the like. However, the present disclosure is not limited to this. For example, all of the blocks (for example, the subtractor 70 and the voltage regulator 71) of the DSP 43 may be implemented with hardware circuit (s) that does not use software (programs). Here, the "hardware circuit" indicates a circuit including circuit elements such as a resistor, a capacitor, a transistor, and the like, a digital circuit such as a logic circuit and the like, and an analog circuit such as an operational amplifier and the like. It should be noted that the terms " . . . er/or or . . . device", " . . . circuit", and " . . . unit"

are used for blocks having predetermined functions implemented by an integrated circuit. For example, "multiplier", "multiplier circuit", or "multiplier unit" is used for a block having a function of multiplying one signal by another signal.

Embodiments of the present disclosure described above are simply to facilitate understanding of the present disclosure and are not in any way to be construed as limiting the present disclosure. The present disclosure may variously be changed or altered without departing from its gist and encompass equivalents thereof.

For example, the determination unit 60 and the signal output units 61 and 62 are implemented in the DSP 43. However, the present disclosure is not limited to this, but only the signal output unit 62 may be implemented. In this case, the DSP 43 operates the AC-DC converter 10 as the PFC circuit in the discontinuous mode.

In an embodiment of the present disclosure, the rectified-voltage calculation unit 95 calculates the rectified voltage Vr, but the present disclosure is not limited thereto. For example, voltage divider resistors for dividing the rectified voltage Vr is provided in the AC-DC converter 10, the ON-period calculation unit 96 may acquire the rectified voltage Vr based on the output from the voltage divider resistors. Even in such a case, it is possible to improve the power factor.

What is claimed is:

1. A drive signal generating circuit for a power supply circuit that includes
   a rectifier circuit that rectifies an AC voltage,
   an inductor configured to be applied with a rectified voltage from the rectifier circuit, and
   a transistor that controls an inductor current flowing through the inductor, the drive signal generating circuit generating a drive signal based on an output voltage generated from the AC voltage and the inductor current, the drive signal being used for turning on and off the transistor, the drive signal generating circuit comprising:
   a digital signal processing (DSP) circuit having
      a DSP core, and
      a non-transitory storage medium having program instructions stored thereon, execution of which by the DSP core causes the DSP circuit to provide functions of:
         a command-value output unit that outputs a command value for increasing the inductor current when the output voltage is lower than a target level and reducing the inductor current when the output voltage is higher than the target level;
         an inductance calculation unit that calculates an inductance of the inductor based on a first current value of the inductor current at a first timing after the inductor current increases from zero, a second current value of the inductor current at a second timing after the inductor current decreases, and the output voltage; and
         an ON-period calculation unit that calculates an ON period in a switching period of the transistor based on the calculated inductance, the rectified voltage, the command value, the switching period, and the output voltage, the ON period being a time period for causing the output voltage to reach the target level and for changing the inductor current according to the rectified voltage; and
   a drive signal output circuit connected to the DSP circuit, the drive signal output circuit outputting the drive signal based on the calculated ON period and the switching period received from the DSP circuit.

2. The drive signal generating circuit according to claim 1, wherein
   the inductance calculation unit calculates the inductance of the inductor based on
      a first time period from a start of the increase in the inductor current from zero to the first timing,
      a second time period from a start of the decrease in the inductor current to the second timing,
      the first current value,
      the second current value, and
      the output voltage.

3. The drive signal generating circuit according to claim 1, wherein
   the inductance calculation unit calculates the inductance of the inductor at intervals each being shorter than a quarter cycle of the AC voltage.

4. The drive signal generating circuit according to claim 3, wherein
   the inductance calculation unit calculates the inductance of the inductor at intervals, the intervals each being shorter than the quarter cycle of the AC voltage and corresponding to the switching period.

5. The drive signal generating circuit according to claim 1, wherein the drive signal output circuit includes:
   a comparator that compares a voltage corresponding to the ON period and a voltage of a triangular wave having an instantaneous value that decreases when a clock signal changes to one logic level and increases when the clock signal changes to another logic level, the clock signal having a same period as the switching period; and
   a gate driver that outputs the drive signal for turning on and off the transistor based on a comparison result of the comparison unit, wherein the inductance calculation unit acquires each of the first current value and the second current value based on a timing when the clock signal changes in logic level, and calculates the inductance.

6. The drive signal generating circuit according to claim 1, wherein the execution of the program instructions by the DSP core causes the DSP circuit to further provide functions of:
   a determination unit that determines whether the second current value is larger than a predetermined value; and
   a storage unit that stores the calculated inductance of the inductor, wherein
   the inductance calculation unit updates the inductance stored in the storage unit when the determination unit determines that the second current value is larger than the predetermined value, and
   the ON-period calculation unit calculates the ON period based on the inductance stored in the storage unit.

7. The drive signal generating circuit according to claim 1, wherein the execution of the program instructions by the DSP core causes the DSP circuit to further provide functions of:
   a mode determination unit that determines whether the inductor current is in a continuous mode in which the inductor current continuously flows or in a discontinuous mode in which the inductor current intermittently flows;
   a first signal output unit that outputs a first signal for turning on and off the transistor, when the mode determination unit determines that the inductor current is in the continuous mode; and a second signal output unit that outputs a second signal for turning on and off the transistor, when the mode determination unit determines that the inductor current is in the discontinuous mode, wherein the second signal output unit includes the command-value output unit, the inductance calculation unit, and the ON-period calculation unit, and the drive signal output circuit is configured to output the second signal as the drive signal.

8. The drive signal generating circuit according to claim 2, wherein the inductance calculation unit calculates the inductance of the inductor at intervals each being shorter than a quarter cycle of the AC voltage.

9. A power supply circuit comprising:

a rectifier circuit that rectifies an AC voltage;

an inductor configured to be applied with a rectified voltage from the rectifier circuit;

a transistor that controls an inductor current flowing through the inductor;

a drive signal generating circuit that generates a drive signal based on the inductor current and an output voltage generated from the AC voltage, the drive signal being used for turning on and off the transistor that controls the inductor current, the drive signal generating circuit comprising:

a digital signal processing (DSP) circuit having
- a DSP core, and
- a non-transitory storage medium having program instructions stored thereon, execution of which by the DSP core causes the DSP circuit to provide functions of:
  - a command-value output unit that outputs a command value for increasing the inductor current when the output voltage is lower than a target level and reducing the inductor current when the output voltage is higher than the target level;
  - an inductance calculation unit that calculates an inductance of the inductor based on a first current value of the inductor current at a first timing after the inductor current increases from zero, a second current value of the inductor current at a second timing after the inductor current decreases, and the output voltage; and
  - an ON-period calculation unit that calculates an ON period in a switching period of the transistor based on the calculated inductance, the rectified voltage, the command value, the switching period, and the output voltage, the ON period being a time period for causing the output voltage to reach the target level and for changing the inductor current according to the rectified voltage; and a drive signal output circuit connected to the DSP circuit, the drive signal output circuit outputting the drive signal based on the calculated ON period and the switching period received from the DSP circuit.

* * * * *